United States Patent
Weaver

(10) Patent No.: US 7,869,794 B1
(45) Date of Patent: Jan. 11, 2011

(54) METHOD AND SYSTEM FOR PROVIDING TIMELY MESSAGE DELIVERY

(75) Inventor: Farni Weaver, Spring Hill, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1591 days.

(21) Appl. No.: 10/781,609

(22) Filed: Feb. 18, 2004

(51) Int. Cl.
*H04M 11/10* (2006.01)

(52) U.S. Cl. ............ 455/412.1; 455/421; 455/412; 455/515; 455/528; 455/422; 455/466; 455/510; 370/349; 370/429

(58) Field of Classification Search ............ 455/450, 455/453, 414.1, 422, 466, 515, 67.11, 422.1, 455/412, 414.2, 509, 59, 61, 412.1; 370/362
See application file for complete search history.

(56) References Cited

U.S. PATENT DOCUMENTS

| | | | |
|---|---|---|---|
| 6,016,424 A * | 1/2000 | Hicks et al. | 455/414.1 |
| 6,606,502 B1 * | 8/2003 | Chung Kam Chung et al. | 455/466 |
| 2004/0105436 A1 * | 6/2004 | Ament | 370/362 |
| 2004/0127176 A1 * | 7/2004 | Rozhavsky et al. | 455/115.1 |
| 2005/0096059 A1 * | 5/2005 | Jiang et al. | 455/450 |

* cited by examiner

*Primary Examiner*—Charles N Appiah
*Assistant Examiner*—Randy Peaches

(57) ABSTRACT

A system is provided for managing timely delivery of electronic messages, such as short message service (SMS) messages sent by the short message peer to peer (SMPP) protocol. In particular, the system determines an expected delay for the delivery of electronic messages, so that a sender can avoid sending messages when they will take an excessive amount of time to deliver. In one embodiment, a sender of electronic messages, such as a news service provider, sends a session initiation protocol (SIP) "subscribe" message to a delay manager. The delay manager determines when the expected delay of message delivery at a bulk message gateway falls below a threshold delay. When the expected delay falls below the threshold, the delay manager informs the sender, and the sender may create and send an electronic message.

3 Claims, 4 Drawing Sheets

METHOD AND SYSTEM FOR PROVIDING TIMELY MESSAGE DELIVERY

BACKGROUND

This invention relates to the sending of electronic messages. In particular, the invention relates to managing delays in the delivery of electronic messages.

Using electronic messaging, service providers can transmit messages nearly instantly to thousands of recipients. Time-sensitive information can be sent using protocols such as, for example, the short message peer to peer (SMPP) protocol for the short message service (SMS) or the session initiation protocol (SIP). Such information is usually sent in the form of short, text-based messages to recipients' mobile telephones, personal digital assistants (PDAs), or computers. Recipients may, for example, request a service provider to automatically keep them up to date with electronic messages reporting on the latest stock prices, weather conditions, sports scores, and news headlines.

As such services become more popular, however, the capacity of electronic networks can be strained to their limits. When the number of messages to be sent outpaces the capacity of a network, messages are placed in a queue until the network has the capacity to send them. When large numbers of messages are sent at once, delivery can be delayed for hours, and the timely information promised through electronic messaging may be stale by the time it is received. The problem is compounded by the ability of service providers to use bulk message gateways. Through a bulk message gateway, a service provider can provide a single message and request that it be multicast to thousands of recipients.

As an example, tens of thousands of recipients may request a service provider to send them electronic messages containing breaking news headlines. When there is breaking news, the service provider sends an electronic message to a bulk message gateway requesting that it be multicast to all of these recipients at once. If the bulk message gateway through which the messages are sent is unable to handle the sudden capacity, the delivery of the messages can be delayed indefinitely. When the message are finally received, they may be too old to be useful, and may at that point be more of an annoyance than a convenience.

SUMMARY

A system is provided for managing timely delivery of electronic messages, such as short message service (SMS) messages. In particular, the system determines an expected delay for the delivery of electronic messages, so that a sender can avoid sending messages when they will take an excessive amount of time to deliver.

A delay manager determines the expected delay for the delivery of an electronic message and informs one or more message senders of the expected delay by sending a delay report. The delay report may convey the length of the expected delay, or it may simply inform the sender whether the expected delay is high or low. Delay reports may be sent, for example, in response to a delay query from a sender or to senders who have subscribed to receive such reports.

In one embodiment, the delay manager determines the expected delay based at least in part on the number of messages in the queue of a bulk message gateway. The delay manager may itself be incorporated in the bulk message gateway.

DETAILED DESCRIPTION

I. Overview

Figure 1:
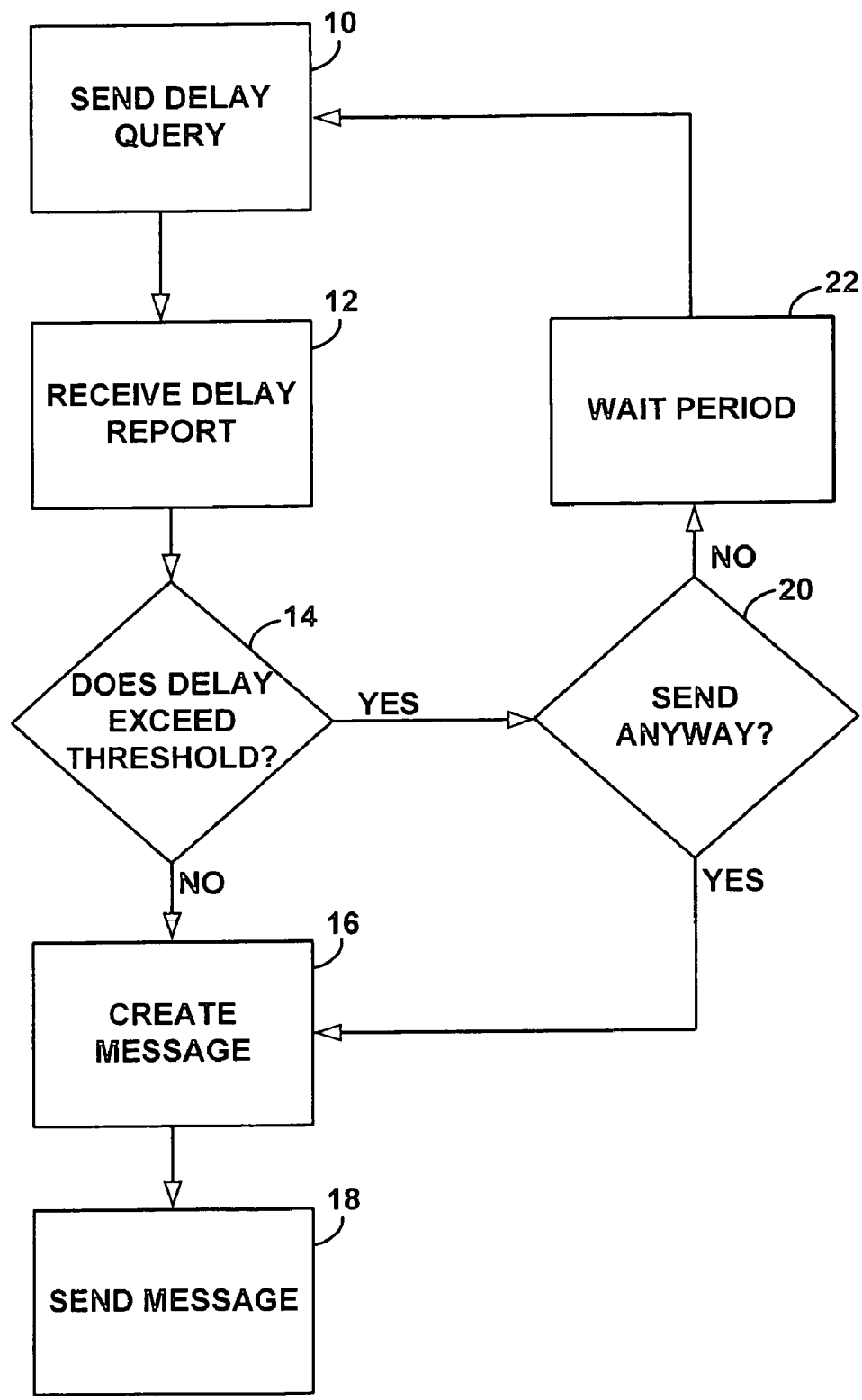
FIG. 1 is a flow diagram of a method performed by a sender of electronic messages.

In one embodiment of system for providing timely message delivery, a delay manager keeps tracks of the expected delay for the delivery of a newly sent electronic message. A message sender learns the expected delay from the delay manager. If the expected delay is sufficiently short, the sender creates a message and sends it to one or more recipients. Otherwise, if the expected delay is excessive, the message sender either does not send a message at all or waits until the expected delay has decreased.

The delay manager can determine the expected delay using one or more of several different methods. For example, the delay manager may determine the expected delay as a function of the number of messages that are queued at a message gateway, or the delay manager may determine the expected delay from measurements of the amount of time elapsed between when the gateway receives a message and when it delivers the message to a recipient. Different methods of determining an expected delay are described in further detail in section II.A, below.

The means by which the message sender learns of the delay can also differ in different embodiments. For example, the message sender may subscribe to a service offered by the delay manager to periodically receive reports of the delay. Alternatively, the sender may request delay information only when the sender intends to send a message. The delay information sent by the delay manager may report to the sender the length of the expected delay, or it may simply report whether or not expected delays are low. Different manners of communicating the expected delay are described in further detail in section II.B.

Different senders may make use of the delay information in different ways. A sender may not wish to create a time-sensitive message, only to delay sending that message for several hours until the expected delay is low. In this case, the sender may wait until the expected delay is low before even creating the message. As a result, the message will not be untimely when it is received. The timing of message creation is discussed in further detail in section II.C.

II. Message Delivery Method

A. Determining the Expected Delay

In one embodiment of message delivery method, a delay manager keeps track of an expected delay in sending an electronic message and sends information concerning the length of the expected delay to potential senders of electronic messages. The delay manager may employ one of several techniques to determine an expected delay.

In a preferred technique for determining an expected delay, the delay manager tracks the number of messages that are queued at a message gateway. The delay manager then determines an expected delay based on the number of messages queued at the gateway, either by a lookup table, a formula, or by some other method. In a system in which the delay manager monitors more than one gateway, the manager can use different lookup tables or formulas for different gateways. For example, one gateway may have an expected delay of thirty minutes when there are 150,000 messages in the queue, while another gateway with a higher capacity may have a shorter expected delay for the same number of messages in the queue. A lookup table or formula may be derived from actual delay measurements from test messages as described above.

In another technique of determining an expected delay, the delay manager can track the amount of time needed for a test message to be delivered by a gateway. (As described in further detail in section III, the delay manager may be associated with or may be a part of a particular message gateway, or the delay manager could be an independent system that services several different message gateways.) For example, the delay manager may send a message to itself through the gateway and measure the elapsed time between when the message was sent and when it was received. This measurement may be performed repeatedly to determine a running average of the expected delay.

In another use of a test message, the message gateway may itself measure the amount of time a test message spends in the message queue and then report that time to the delay manager. Such a test message may be specifically constructed as a test message (e.g., a message sent by the delay manager), or it may be an ordinary message sent by the message gateway.

In one embodiment, the delay manager may determine what the expected delay is for a large number of electronic messages sent at once. As an example, if a sender sends a single electronic message to a gateway, the expected delay for delivering that message may be three minutes. If, however, the same sender were to send five thousand messages to the same gateway at the same time, the expected delay may be much longer.

B. Communicating Expected Delays

The delay manager communicates information on the expected delay to potential message senders using one or more techniques. In general, the delay manager may send periodic reports on expected delays, it may send reports in response to changes in the expected delay, or it may send reports in response to requests by prospective message senders. The content of the report may be, for example, a listing of the expected delay at one or more message gateways, or it may simply be a report of whether or not the delay at a gateway is excessive.

In one embodiment, the delay manager sends a delay report to message senders who have subscribed to receive delay reports. Message senders subscribe by, for example, sending a SIP SUBSCRIBE message to the delay manager. The delay manager may send reports hourly, for example. Alternatively, the delay manager may keep track of the expected delay and send reports to subscribers only in response to changes in the expected delay. The changes that trigger a report may vary in different embodiments. For example, the delay manager may send one report when the expected delay exceeds a threshold delay, and it may send another report when the expected delay falls back under the threshold delay. Different threshold delays may be used for different subscribers.

In an embodiment making use of a threshold delay, a report is not sent to the user until the expected delay remains below the threshold delay for a predetermined period of time.

One foreseeable problem could occur if, whenever the expected delay at a gateway fell below a threshold, the delay manager were simultaneously to send delay reports to hundreds of potential senders. If so, many of these potential senders could attempt to send electronic messages through the gateway at once, and the actual delay in delivering all these messages could far exceed the expected delay. To reduce the likelihood of such a problem, the delay manager may introduce an offset in the delay reports. For example, the delay manager could introduce a random delay in the time at which delay reports are sent to different senders, or the delay manager could provide preselected senders (such as premium subscribers who pay a fee for enhanced service) with a delay report instantly, while sending delay reports to other senders at a later time.

As an alternative to subscription-based reports (or in addition to such reports), the delay manager may send delay reports in response to delay queries from message senders. A delay query may request the delay status of one or more message gateways. In response to receiving a message query from a sender, the delay manager sends delay reports to the senders.

The delay manager can provide reports on the expected delay at more than one message gateway. In such an embodiment, the delay manager can identify in a delay report the gateway or gateways for which it is providing expected delay information. Senders can identify which gateways of which they wish to learn delay information, for example by specifying the gateways in a delay query, by specifying the gateways in a request to subscribe to the delay manager.

As described above in section II.A, the delay manager may determine an expected delay for a large number of messages sent at once. In such a case, a delay query may identify the number of messages that the sender intends to send (or, if the sender is sending a message through a bulk message gateway, the number of recipients to whom the message is to be multicast). The delay report created by the delay manager in turn identifies the expected delay for the identified number of messages. When several messages are sent at approximately the same time, some messages can be expected to be delivered before others, so that the expected delay will differ for the different messages. To accommodate these differences, the delay report may provide a list of expected delays, an average expected delay, or a median expected delay. In one use of a list of expected delays, the delay report lists the expected delays for the first and last message. In another use of a list of expected delays, the list is a sample of expected delays, such as the expected delay of the first message, the one-hundredth message, the two-hundredth message, and so on.

Delay queries and delay reports may be sent using any one of several different protocols. They may be, for example in SIP format, SMPP format, user datagram protocol (UDP) format, hypertext transfer protocol (HTTP) format, or other formats. Delay queries and delay reports are not necessarily sent in the same format as the electronic messages. For example, a delay report conveying information on the expected delay at an SMS gateway may be sent as a SIP message or a UDP datagram.

A delay query may itself include an electronic message. In this case, the delay query is sent to the delay manager. If the expected delay is below a threshold delay, the delay manager sends the included message to a gateway for delivery. The threshold delay may be set in a variety of ways. For example, the threshold delay could be communicated in the delay query, it could be arranged by a subscription with the sender, or it could be determined otherwise. In different embodiments, the delay manager may or may not inform the sender of whether the electronic message was sent to the gateway for delivery.

C. Making Use of Delay Reports

Different senders may react differently to delay reports. For example, one sender may not even create an electronic message until after it receives a report. Another sender may create one or more messages and store the message until the expected delay is sufficiently low.

As an example, consider a service provider that sends regular updates of the score of a basketball game in progress. The service provider can reduce the likelihood that the scores will be outdated when they are received if it creates messages only when the expected delay is sufficiently low. In contrast, if the service provider were to create the message while the expected delay was high, a team may score several times before the service provider even sent the message.

It should be noted that, in a preferred embodiment, senders are free to use delay reports as they wish, as opposed to being blocked from sending messages when the expected delay is lengthy. For example, if a particular message must get to a recipient as soon as possible, then the sender may send the message to the gateway regardless of the expected delay. On the other hand, if it is important that the message be as up-to-date as possible at the time it is received, the sender can communicate with the delay manager to determine when the expected delay is low.

How low the expected delay should be before sending a message may be within the discretion of the sender. For example, consider a sender that provides news headlines by electronic message. The sender may attempt to provide headlines that are no more than ten minutes old when they are received. The sender may also endeavor to provide recipients with hourly updates. In a period of network congestion, expected delays may not fall below ten minutes for hours, interfering with hourly message delivery. To best achieve the desired level of service, the sender may determine the expected delay at the top of the hour and for no more than twenty minutes thereafter, and create and send a message with the latest headlines as soon as the expected delay falls below ten minutes. At twenty minutes past the hour, however, the sender may send a message with the latest headlines regardless of the expected delay, so that the recipient will still receive that hour's update, albeit somewhat delayed.

Even if there is no particular requirement that a message be as up-to-date as possible before it is received, a sender may still choose not to send a message until the expected delay is low so as not to add to network congestion.

D. Exemplary Methods

1. An Exemplary Sender Method

As described above, a message sender may make use of delay reports in various ways. One such way is illustrated in FIG. 1. At step 10, a message sender sends a delay query to a delay manager. The sender receives a delay report in response to its query at step 12. The delay report includes the length of the expected delay. The sender determines in step 14 if the expected delay is greater than a threshold, such as thirty minutes. If the delay is not greater than the threshold, the sender creates a message (such as a report of breaking news headlines) at step 16 and it sends the message at step 18.

If, at step 14, the sender determines that the expected delay is greater than the threshold, the sender decides at step 20 whether it should send the message anyway. For example, if the expected delay has been above the threshold for an excess period of time, the sender may decide to send the message anyway to ensure that the sending of the message is not delayed indefinitely. If the sender decides not to send the message anyway, it may then allow a wait period to pass (step 22) before sending another delay query (step 10). The wait period may be fixed, such as five minutes, or it may be keyed to the value of the expected delay (e.g., the sender could wait for half of the expected delay before requesting another delay report).

2. An Exemplary Delay Manager Method

Figure 2:
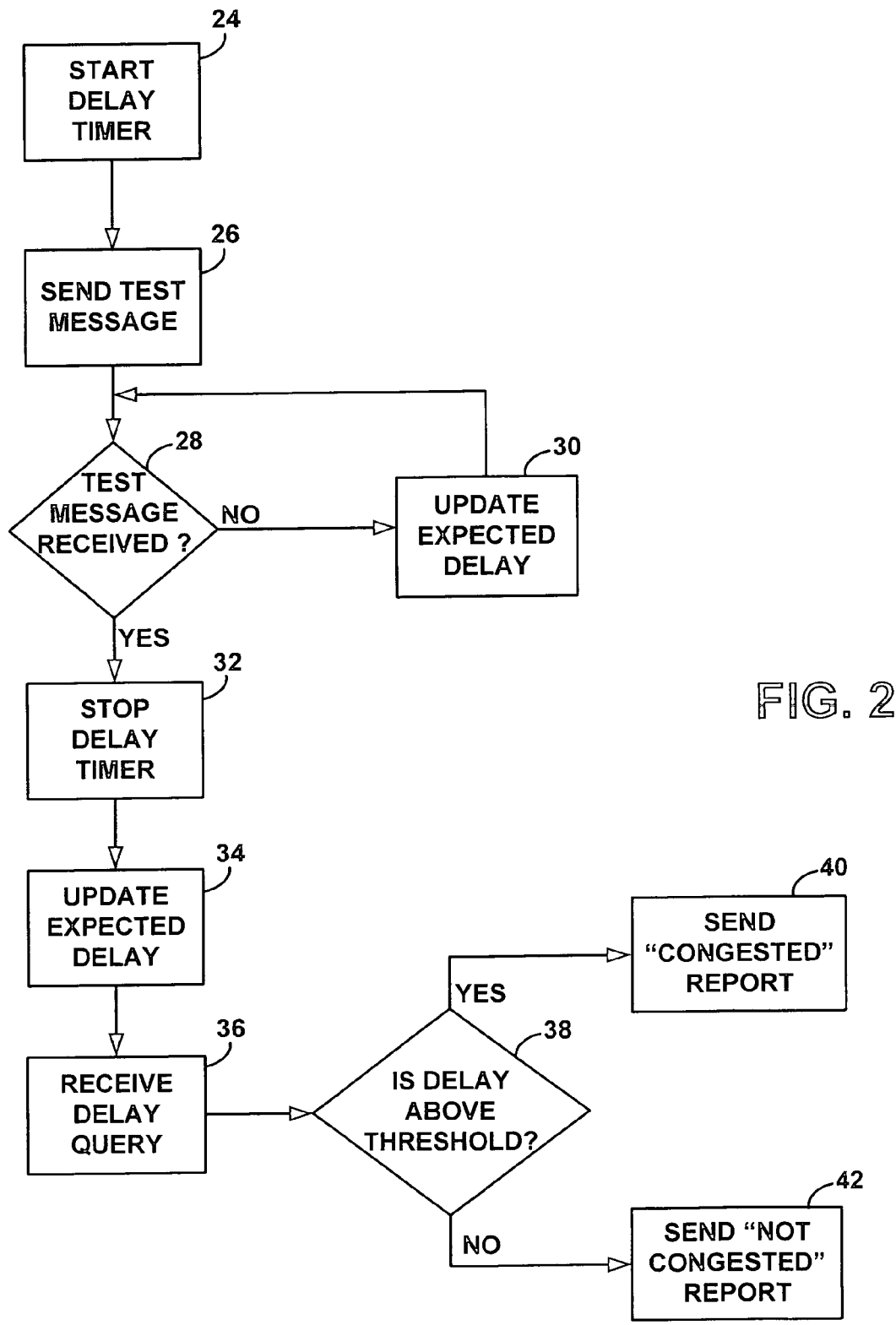
FIG. 2 is a flow diagram of a method performed by a delay manager.

The delay manager may implement various options in determining and reporting on expected delays. One set of those options is illustrated in FIG. 2. Namely, the delay manager uses test messages to determine the expected delay, and it sends delay reports in response to queries from senders.

To determine an expected delay, the delay manager starts a delay timer at step 24 and sends out an electronic message that is addressed to itself (step 26). The timer measures the actual delay of delivering the message, and it runs while the delay manager waits for the message to be received (step 28). If the message has not yet been received, the delay manager knows that the actual delay will be at least as long as the delay measured thus far on the delay timer, and it can update the expected delay accordingly in step 30. For example, if the value on the timer exceeds a previously measured expected delay, the delay manager may update the expected delay to equal the current value on the timer.

Once the test message is received, the delay manager stops the delay timer (step 32) and updates the expected delay according to the value on the timer (step 34).

As described above, a delay manager may respond to delay queries by reporting the value of the delay or by reporting whether or not there is congestion at the message gateway. The latter approach is illustrated in FIG. 2. After the delay manager receives a delay query from a sender (step 36), it determines whether the expected delay is above a threshold level (step 38). If so, the delay manager sends to the querying sender a delay report indicating that there is congestion (step 40). Otherwise, the delay manager sends a delay report indicating that there is not congestion (step 42).

III. Message Delivery System

Figure 3:
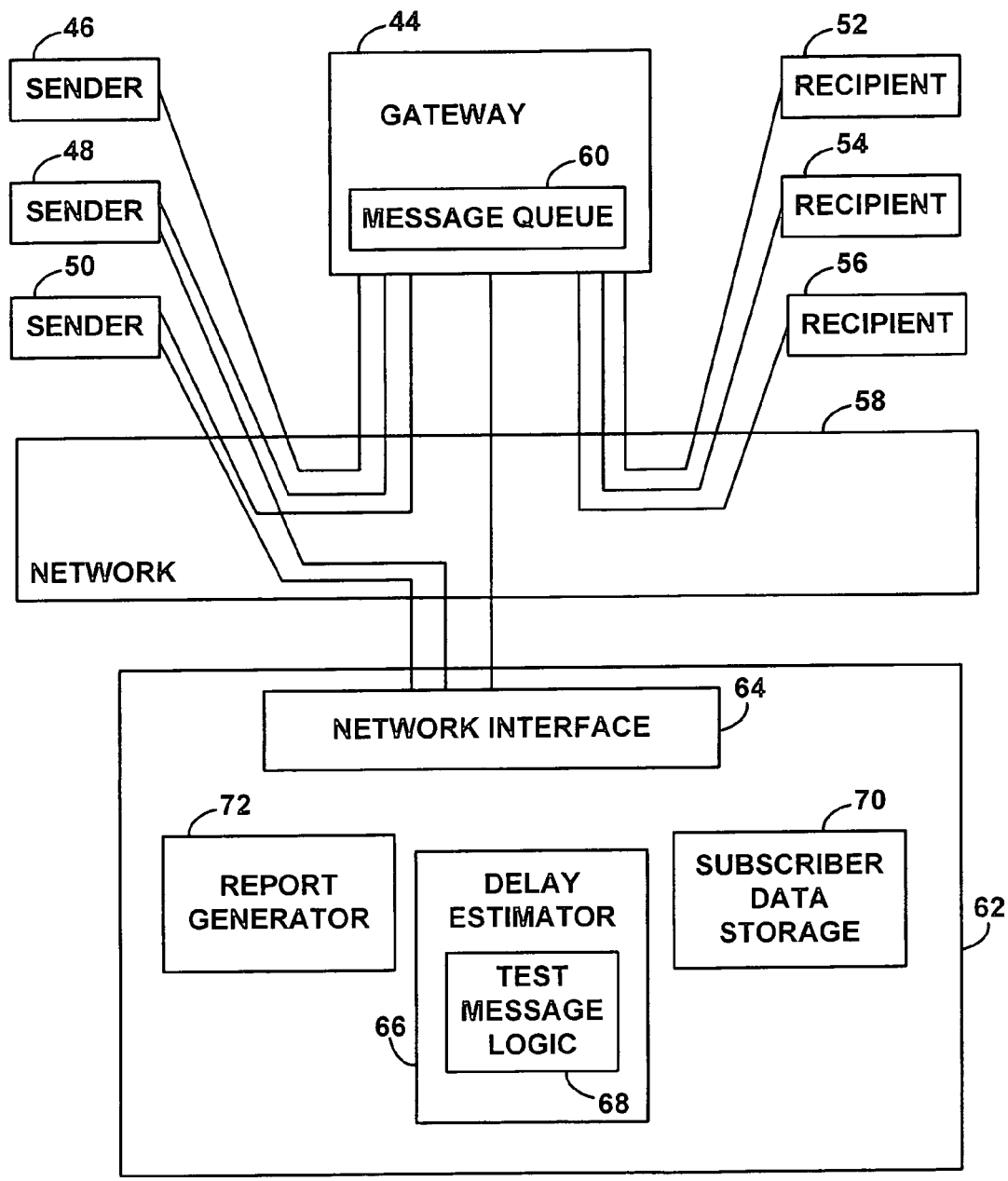
FIG. 3 is a block diagram illustrating the architecture of a system for delivering electronic messages.

In a system for delivering electronic messages (FIG. 3), a message gateway 44 connects senders 46, 48, 50 with recipients 52, 54, 56. Senders can send one or more messages to the gateway, and the gateway forwards the messages to the recipients. Communications between the senders, the gateway, and the recipients may take place over a network 58, such as the Internet, a wireless voice and data network, or other electronic pathways, alone or in combination with one another. The gateway includes a message queue 60, in which messages received from senders are stored until they can be delivered to their recipients by the gateway. The queue may be, for example, a first-in-first-out queue. In one embodiment, the gateway has a multicasting capability, allowing a single message from a sender to be distributed to a large number of recipients.

A delay manager 62 is in communication with one or more of the senders and with the gateway. (The delay manager may be in communication with more than one gateway; for clarity, only one is illustrated.) The delay manager includes a network interface 64 for communicating with the senders and with the gateway. As an alternative, the delay manager 62 may be incorporated in the message gateway. For example, the delay manager and message gateway may both be implemented by software operating on the same server computer, or they may be implemented on separate computers in the same location. When the delay manager is incorporated with the message gateway, they can communicate with one another without an intervening network. As an alternative, the delay manager may be incorporated with a message sender.

To track the expected delays in sending electronic messages, the delay manager includes a delay estimator 66. The delay estimator may operate differently in different embodiments of the delay manager. For example, in one embodiment, the delay estimator communicates with the gateway to learn the number of messages in the gateway's queue and then determines the expected delay from a formula or a lookup table. In another embodiment, the delay estimator requests expected delay information from the gateway itself. The delay estimator may include test message logic 68 that operates to send and receive test messages to measure the expected delay.

In an embodiment in which the delay manager sends delay reports to subscribers, the delay manager includes subscriber data storage 70 that identifies senders to which reports are to be sent. The subscriber data storage may also identify when such reports are to be sent to the subscribers (e.g. periodically, or when an expected delay crosses a threshold).

The delay manager is provided with a report generator 72 that generates delay reports. Such delay reports may be generated in response to a delay query received through the network interface, or they may be generated for subscribers identified in the subscriber data storage.

The report generator in one embodiment compares the expected delay with a threshold delay and sends a delay report to a sender indicating whether the expected delay is below the threshold delay. In one implementation of this embodiment, the delay report generator creates a report only if the expected delay is below the threshold delay. In another implementation of this embodiment, the delay report generator sends a report indicating that the expected delay is above or below the threshold delay. Such a report may indicate, for example, that the message gateway is "congested" or "not congested."

Figure 4:
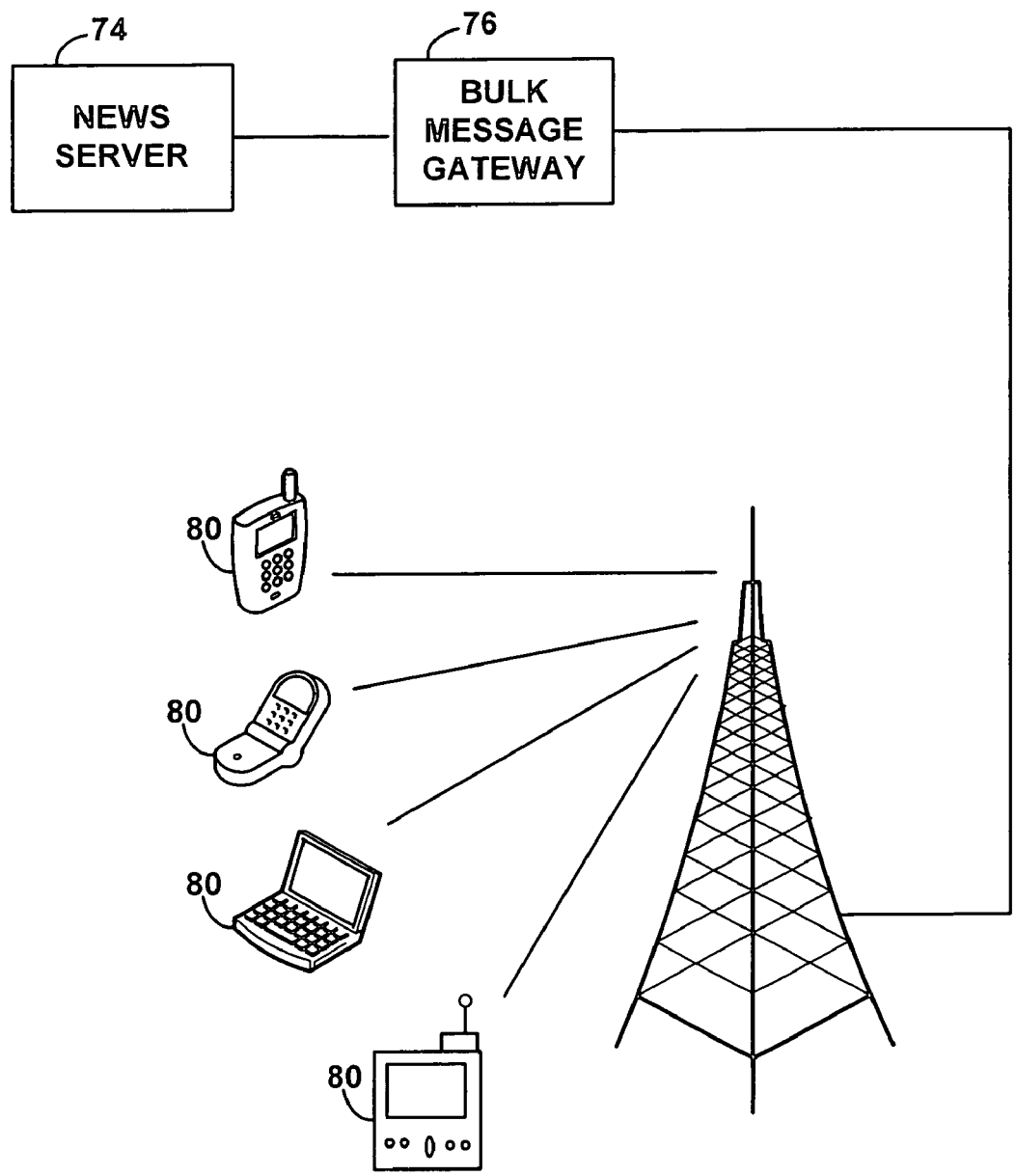
FIG. 4 is a schematic block diagram illustrating one implementation of a system for delivering electronic messages.

One preferred implementation of a message delivery system is illustrated in FIG. 4. A news server 74 subscribes with a delay manager incorporated in a bulk message gateway 76. To subscribe to the bulk message gateway, the news server 74 sends a SIP SUBSCRIBE message to the bulk message gateway, asking to be notified when the expected delay falls below a threshold. When the expected delay falls below the threshold, the bulk message gateway sends a SIP NOTIFY message to the news server. The news server then generates an SMS message containing news headlines and sends the message to the bulk message gateway. The bulk message gateway 76 multicasts the message over a network 78 (such as a CDMA wireless network) to a multitude of recipients 80.

The components of the system described above may be implemented in computer software or hardware. In one embodiment, components of the delay manager such as the report generator, delay estimator, and test message logic are implemented as executable instructions stored in a computer memory and executed by a processor. The network interface may be implemented as a combination of network hardware (such as a modem or network card) with compatible software, and the subscriber data storage may be implemented as a database, a data structure, or a data file stored in a computer memory.

IV. Alternative Embodiments

In an alternative implementation, the delay manager may be incorporated with the message sender. For example, the message sender itself could determine the length of the expected delay by send test messages or by other means.

The examples given above are provided to illustrate the breadth of the invention and should not be taken as limitations on the scope thereof.

The invention claimed is:

1. A message delivery method, comprising:
   determining whether an expected delay for delivery of an electronic message is less than a threshold delay, wherein the expected delay is the expected delay for delivery of an electronic message by a message gateway, wherein determining whether the expected delay is less than a threshold delay includes receiving a delay report, and wherein the delay report indicates whether the expected delay exceeds a threshold delay;
   creating the electronic message only after determining that the expected delay is less than the threshold delay; and
   sending the electronic message to the message gateway only after determining that the expected delay is less than the threshold delay.

2. The method of claim 1, wherein determining whether the expected delay is less than a threshold delay includes sending a delay query.

3. The method of claim 1, wherein the electronic message is a short message service message.

* * * * *